(12) United States Patent
Konno (10) Patent No.: US 12,535,880 B2
(45) Date of Patent: Jan. 27, 2026

(54) VISUAL LINE DETECTING APPARATUS, IMAGE DISPLAY APPARATUS, AND VISUAL LINE PROCESSING APPARATUS

(71) Applicant: CANON KABUSHIKI KAISHA, Tokyo (JP)

(72) Inventor: Yoshihiko Konno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 666 days.

(21) Appl. No.: 17/966,939

(22) Filed: Oct. 17, 2022

(65) Prior Publication Data
US 2023/0128267 A1    Apr. 27, 2023

(30) Foreign Application Priority Data
Oct. 25, 2021 (JP) .................... 2021-173644

(51) Int. Cl.
| | |
|---|---|
| G06F 3/01 | (2006.01) |
| G02B 27/01 | (2006.01) |
| G06T 7/70 | (2017.01) |
| G06V 10/141 | (2022.01) |
| G06V 40/18 | (2022.01) |
| H04N 13/344 | (2018.01) |

(52) U.S. Cl.
CPC ......... *G06F 3/013* (2013.01); *G02B 27/0172* (2013.01); *G06T 7/70* (2017.01); *G06V 10/141* (2022.01); *G06V 40/18* (2022.01); *H04N 13/344* (2018.05); *G02B 2027/0178* (2013.01)

(58) Field of Classification Search
CPC ........ G02B 27/0172; G02B 2027/0178; G02B 27/0093; G06F 3/013; G06V 10/141; G06V 40/18; G06V 40/165; G06V 40/171; G06V 40/193; G06T 7/70; H04N 13/344
See application file for complete search history.

(56) References Cited

U.S. PATENT DOCUMENTS

| | | | |
|---|---|---|---|
| 9,823,473 B2 * | 11/2017 | Kobayashi | ......... G02B 27/0093 |
| 10,175,484 B2 * | 1/2019 | Yajima | ................. G02B 27/017 |
| 10,380,418 B2 | 8/2019 | Agrawal | |
| 10,757,399 B2 * | 8/2020 | Russell | ................ H04N 13/133 |

(Continued)

FOREIGN PATENT DOCUMENTS

| | | |
|---|---|---|
| JP | 10-179520 A | 7/1998 |
| JP | 3186072 B2 | 7/2001 |

*Primary Examiner* — Wesley J Tucker
(74) *Attorney, Agent, or Firm* — Cowan, Liebowitz & Latman, P.C.

(57) ABSTRACT

A visual line detecting apparatus includes a plurality of right-eye illumination elements, a plurality of left-eye illumination elements, a right-eye camera configured to capture an image formed by light reflected by the right eye, out of the lights from the plurality of right-eye illumination elements, and a left-eye camera configured to capture an image formed by light reflected by the left eye, out of the lights from the plurality of left-eye illumination elements. An imaging direction of the right-eye camera and an imaging direction of the left-eye camera are different from each other and a position of the right-eye camera relative to the right eye and a position of the left-eye camera relative to the left eye are different from each other in a vertical direction orthogonal to a lateral direction in which the right eye and the left eye are arranged.

8 Claims, 12 Drawing Sheets

(56) References Cited

U.S. PATENT DOCUMENTS

| | | | | |
|---|---|---|---|---|
| 11,109,009 | B2* | 8/2021 | Kikukawa | H04N 13/398 |
| 11,455,031 | B1* | 9/2022 | Sharma | G06F 3/013 |
| 11,537,202 | B2* | 12/2022 | Kassner | G06F 13/382 |
| 11,676,422 | B2* | 6/2023 | Dierkes | G06V 40/197 |
| | | | | 345/8 |
| 12,333,068 | B2* | 6/2025 | Russell | A61B 3/14 |
| 2017/0116476 | A1* | 4/2017 | Publicover | H04N 23/56 |
| 2018/0217380 | A1* | 8/2018 | Nishimaki | G02B 27/0176 |
| 2019/0025912 | A1* | 1/2019 | Kimura | G06F 3/013 |
| 2019/0163267 | A1* | 5/2019 | Hainzl | G02B 27/017 |
| 2024/0085703 | A1* | 3/2024 | Chen | G02B 27/0093 |
| 2024/0264471 | A1* | 8/2024 | Fan | G02F 1/294 |
| 2024/0295759 | A1* | 9/2024 | Tornéus | G02C 5/22 |
| 2025/0123482 | A1* | 4/2025 | Mamishin | G02B 27/1086 |
| 2025/0199320 | A1* | 6/2025 | McNally | G02B 27/0172 |

* cited by examiner

| EYELID CHARACTERISTIC | VISUAL LINE DIRECTION | RIGHT-EYE IRED | | | | | | | | | LEFT-EYE IRED | | | | | | | | |
|---|---|---|---|---|---|---|---|---|---|---|---|---|---|---|---|---|---|---|---|
| | | 8 | 9 | 10 | 11 | 12 | 13 | 14 | 15 | 16 | 17 | 18 | 19 | 20 | 21 | 22 | 23 | 24 | 25 |
| UPPER EYELID IS THICK | FRONT | × | ○ | ○ | ○ | × | × | × | × | × | ○ | ○ | × | × | × | × | × | × | × |
| | UPWARD | ○ | ○ | ○ | × | × | × | × | × | × | ○ | ○ | ○ | × | × | × | × | × | × |
| | DOWNWARD | × | × | × | ○ | ○ | ○ | × | × | × | × | × | × | × | × | × | × | × | × |
| | RIGHTWARD | × | ○ | × | × | × | × | × | × | ○ | ○ | × | × | × | × | × | × | × | ○ |
| | LEFTWARD | × | × | × | × | × | × | ○ | ○ | × | × | × | × | × | × | × | × | × | × |
| LOWER EYELID IS THICK | FRONT | ○ | × | × | × | × | × | × | × | ○ | × | ○ | ○ | ○ | ○ | × | × | × | × |
| | UPWARD | × | × | × | × | × | × | × | × | × | × | ○ | ○ | ○ | ○ | ○ | × | × | × |
| | DOWNWARD | ○ | × | ○ | × | × | × | × | × | × | × | ○ | ○ | × | × | × | × | × | × |
| | RIGHTWARD | × | × | × | × | × | × | × | × | × | × | × | × | × | × | × | ○ | ○ | ○ |
| | LEFTWARD | ○ | × | × | × | × | × | × | × | ○ | × | × | × | × | × | × | × | × | × |

VISUAL LINE DETECTING APPARATUS, IMAGE DISPLAY APPARATUS, AND VISUAL LINE PROCESSING APPARATUS

BACKGROUND

Technical Field

The disclosure relates to a visual line detecting apparatus that can detect visual line directions of both eyes independently of each other.

Description of the Related Art

A visual line detecting apparatus mounted on an image display apparatus, such as a head mount display (HMD), irradiates left and right eyeballs of a user (observer) with lights from light emitting elements disposed around the left and right eyes, and detects the visual line directions of the left and right eyes by capturing images formed by reflected lights from corneas with left and right cameras.

A visual line detecting apparatus disclosed in Japanese Patent Laid-Open No. ("JP") 10-179520 includes left and right cameras disposed in front of the left and right eyes via display optical systems for presenting images to the left and right eyes, and captures the left and right eyes from the imaging directions equal to each other (imaging optical axis directions parallel to each other). The visual line detecting apparatus disclosed in JP 10-179520 shifts an imaging sensor in each camera in a direction orthogonal to the imaging optical axis from the optical system, and thereby reduces influence of displacement of the HMD mounted on the user on detection of the visual line direction. A visual line detecting apparatus disclosed in U.S. Pat. No. 10,380,418 includes left and right cameras disposed at oblique positions shifting from front positions of the left and right eyes, and images the left and right eyes from different imaging directions.

However, in the visual line detecting apparatus disclosed in JP 10-179520, a pair of the display optical system and the camera are aligned with the imaging optical axis direction, and thus the HMD becomes thicker in the imaging optical axis direction.

In the case where an eyeball is imaged from the oblique direction for each eye as in the visual line detecting apparatus disclosed in U.S. Pat. No. 10,380,418, a light shielding problem occurs due to a three-dimensional structure of the eye of the user, such as an eyelid. More specifically, since the eyeballs are detected on the condition of a mirror image relationship between the right and left eyeballs, light shielding conditions at the eyelids are common to the left and right eyeballs. Therefore, in a case where the user moves the visual lines in the vertical directions and the visual line direction of one eye cannot be detected, it is highly likely that the visual line direction of the other eye cannot be detected as well.

SUMMARY

The disclosure provides a visual line detecting apparatus that can raise the probability of detecting a visual line direction on at least one of the right-eye side and the left-eye side regardless of three-dimensional structures and visual line directions of the eyes of the user.

A visual line detecting apparatus according to one aspect of the disclosure configured to detect visual line directions of a right eye and a left eye includes a plurality of right-eye illumination elements each configured to emit light to the right eye, a plurality of left-eye illumination elements each configured to emit light to the left eye, a right-eye camera configured to capture an image formed by light reflected by the right eye, out of the lights from the plurality of right-eye illumination elements, and a left-eye camera configured to capture an image formed by light reflected by the left eye, out of the lights from the plurality of left-eye illumination elements. The right-eye camera and the left-eye camera are arranged such that an imaging direction of the right-eye camera and an imaging direction of the left-eye camera are different from each other and a position of the right-eye camera relative to the right eye and a position of the left-eye camera relative to the left eye are different from each other in a vertical direction orthogonal to a lateral direction in which the right eye and the left eye are arranged.

An image display apparatus according to another aspect of the disclosure includes the above visual line detecting apparatus, display elements configured to display images, and display optical systems configured to guide lights from the display elements to the right eye and the left eye.

A visual line processing apparatus according to another aspect of the disclosure includes the above visual line detecting apparatus, and an external imaging camera configured to capture an external area. The visual line processing apparatus detects gaze positions of the right eye and the left eye in the external area based on the visual line directions detected by the visual line detecting apparatus.

Further features of the disclosure will become apparent from the following description of exemplary embodiments with reference to the attached drawings.

DESCRIPTION OF THE EMBODIMENTS

Referring now to the accompanying drawings, a description will be given of embodiments according to the disclosure.

First Embodiment

Figure 1:
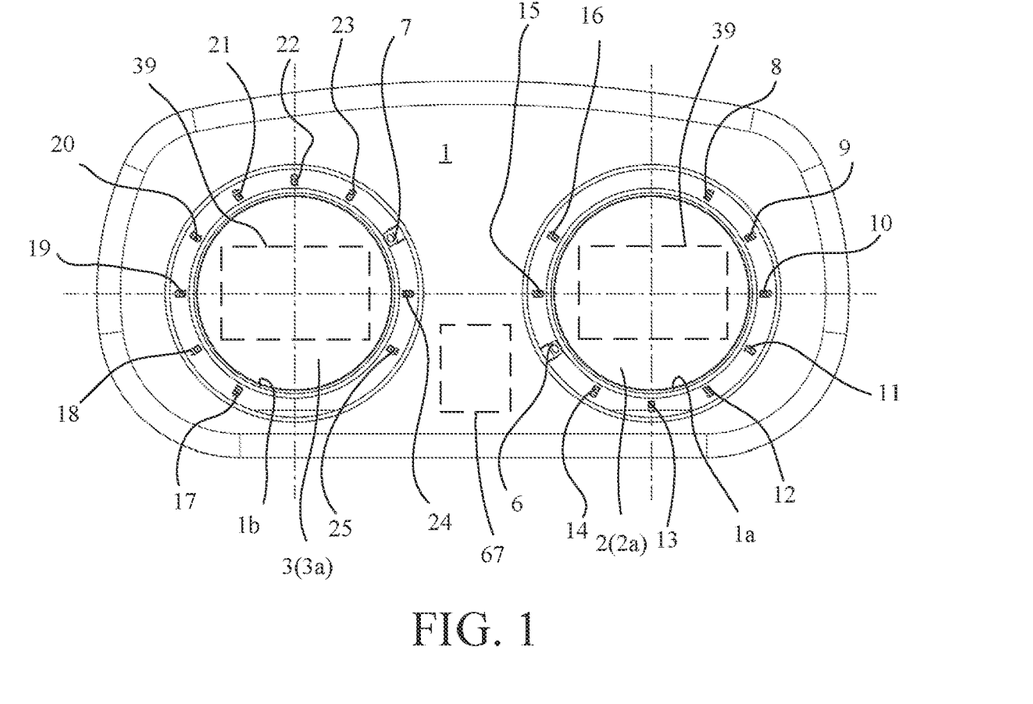
FIG. 1 is a front view of a display unit in an HMD that includes a visual line detecting apparatus according to a first embodiment.
Figure 2:
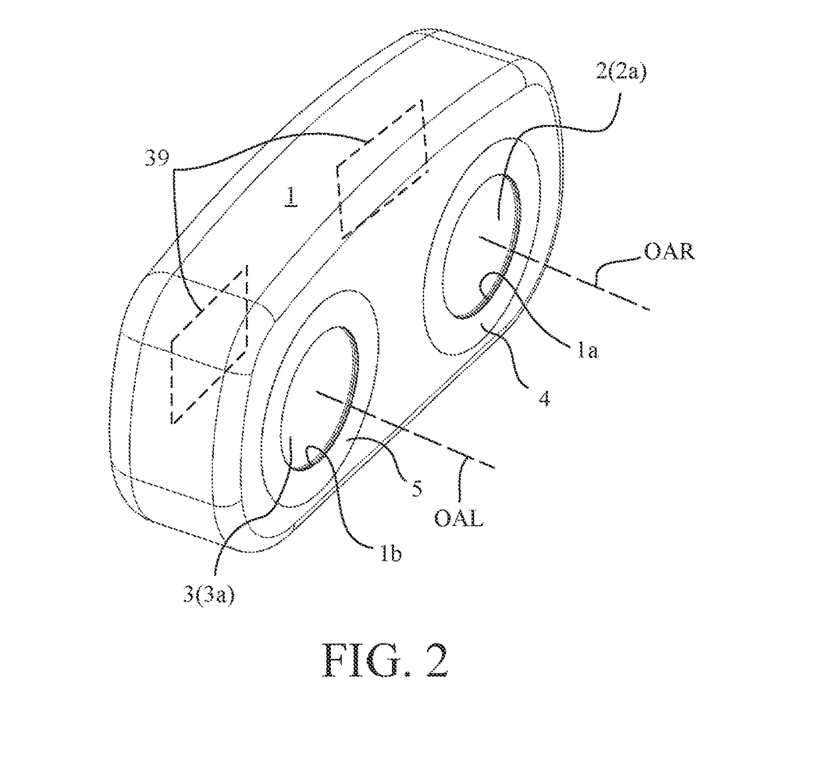
FIG. 2 is a perspective view of the display unit according to the first embodiment.

FIGS. 1 and 2 each illustrate a display unit in a head mount display (HMD) as an image display apparatus that includes a visual line detecting apparatus according to a first embodiment of the disclosure. The HMD includes the display unit and an unillustrated attachment gear, and is mounted on the head of the user (observer or detected person) by the attachment gear. Thereby, the display unit is disposed in front of the user. FIG. 1 illustrates the display unit viewed from an image side (side of the eyes of the user), and FIG. 2 illustrates the display unit viewed obliquely from above.

The display unit includes a unit body 1, a right-eye optical system 2, and a left-eye optical system 3 as display optical systems held by the unit body 1, and right-eye and left-eye display elements 39. The right-eye and left-eye optical systems 2 and 3 transmit lights from the display elements 39 such as an LCD and an organic EL panel to the right and left eyes of the user wearing the HMD on the head through exit surfaces 2a and 3a in a right opening 1a and a left opening 1b provided in the unit body 1, respectively. The user can observe images displayed on both display elements 39 in a case where the lights from the exit surfaces 2a and 3a of the right-eye and left-eye optical systems 2 and 3 enter the right and left eyes.

In the following description, a direction in which the right-eye and left-eye optical systems 2 and 3 (in other words, the right and left eyes of the user) are arranged will be referred to as a lateral (left-right) direction. Each of directions in which optical axes OAR and OAL of the right-eye and left-eye optical systems 2 and 3 extend (directions from the exit surfaces to the left and right eyes) will be referred to as an optical axis direction. A direction orthogonal to the lateral direction and the optical axis direction (a direction orthogonal to the lateral direction) will be referred to as a vertical (up-down) direction.

In FIG. 1, a right-eye visual line detecting unit and a left-eye visual line detecting unit are provided around the right opening 1a and the left opening 1b, respectively. The right-eye visual line detecting unit includes a single right-eye visual line sensor 6 and a plurality (nine in this embodiment) of right-eye illumination elements 8 to 16. The left-eye visual line detecting unit includes a single left-eye visual line sensor 7 and a plurality (nine) of left-eye illumination light elements 17 to 25. Each illumination element includes an infrared light emitting diode (IRED). In the following description, the right-eye illumination element and the left-eye illumination element will be referred to as the right-eye IRED and the left-eye IRED, respectively. The right-eye visual line sensor 6 and the left-eye visual line sensor 7 respectively correspond to a right-eye camera and a left-eye camera having an imaging lens and an infrared (IR) imaging sensor.

In FIG. 2, covers 4 and 5 disposed around the right-eye optical system 2 and the left-eye optical system 3 are made of a material that does not transmit visible light but transmits infrared light, and they cover the right-eye visual line detecting unit and the left-eye visual line detecting unit so as to hide them from the outside. FIG. 1 illustrates the display unit from which the covers 4 and 5 are detached.

In the right-eye visual line detecting unit illustrated in FIG. 1, the right-eye visual line sensor 6 is located at the 8 o'clock position around the optical axis OAR of the right-eye optical system 2 (240° clockwise from the top 0 o'clock position) (=30°×8; this will be applied similarly below). The left-eye visual line sensor 7 is located at the 2 o'clock position around the optical axis OAL of the left-eye optical system 3. Thus, the right-eye visual line sensor 6 and the left-eye visual line sensor 7 are respectively located at different positions in the vertical direction and at different positions in the lateral direction with respect to the optical axis OAR of the right-eye optical system 2 (that is, the right eye of the user) and the optical axis OAL of the left-eye optical system 3 (that is, left eye of the user). More specifically, the right-eye visual line sensor 6 and the left-eye visual line sensor 7 are disposed at positions opposite to each other in the vertical direction (on the lower side and upper side) and opposite to each other in the lateral direction (on the left side and right side) with respect to the right eye and the left eye.

In the right-eye visual line detecting unit, the right-eye IREDs 8 to 16 are located at the 1 o'clock position, 2 o'clock position, 3 o'clock position, 4 o'clock position, 5 o'clock position, 6 o'clock position, 7 o'clock position, 9 o'clock position, and 10 o'clock position around the optical axis OAR of the right-eye optical system 2, respectively. In the left-eye visual axis detection unit, the left-eye IREDs 17 to 25 are located at the 7 o'clock position, 8 o'clock position, 9 o'clock position, 10 o'clock position, 11 o'clock position, 0 o'clock position, 1 o'clock position, and 3 o'clock position around the optical axis OAL of the left-eye optical system 3, respectively.

That is, the number of right-eye IREDs 8 to 16 in a lower (one) area of the right-eye visual line sensor 6 is more than that in an upper (other) area of the right-eye visual line sensor 6 for the right eye. The number of left-eye IREDs 17 to 25 in the upper area of the left-eye visual line sensor 7 is more than in the lower area of the left-eye visual line sensor 7 for the left eye. Thus, an arrangement of the right-eye IREDs 8 to 16 for the right eye and an arrangement of the left-eye IREDs 17 to 25 for the left eye are different from each other.

The right-eye and left-eye visual line sensors 6 and 7 and the right-eye and left-eye IREDs 8-25 are connected to a control circuit (control unit) 67 illustrated in FIG. 1, which constitute a visual line detecting apparatus.

Figure 3:
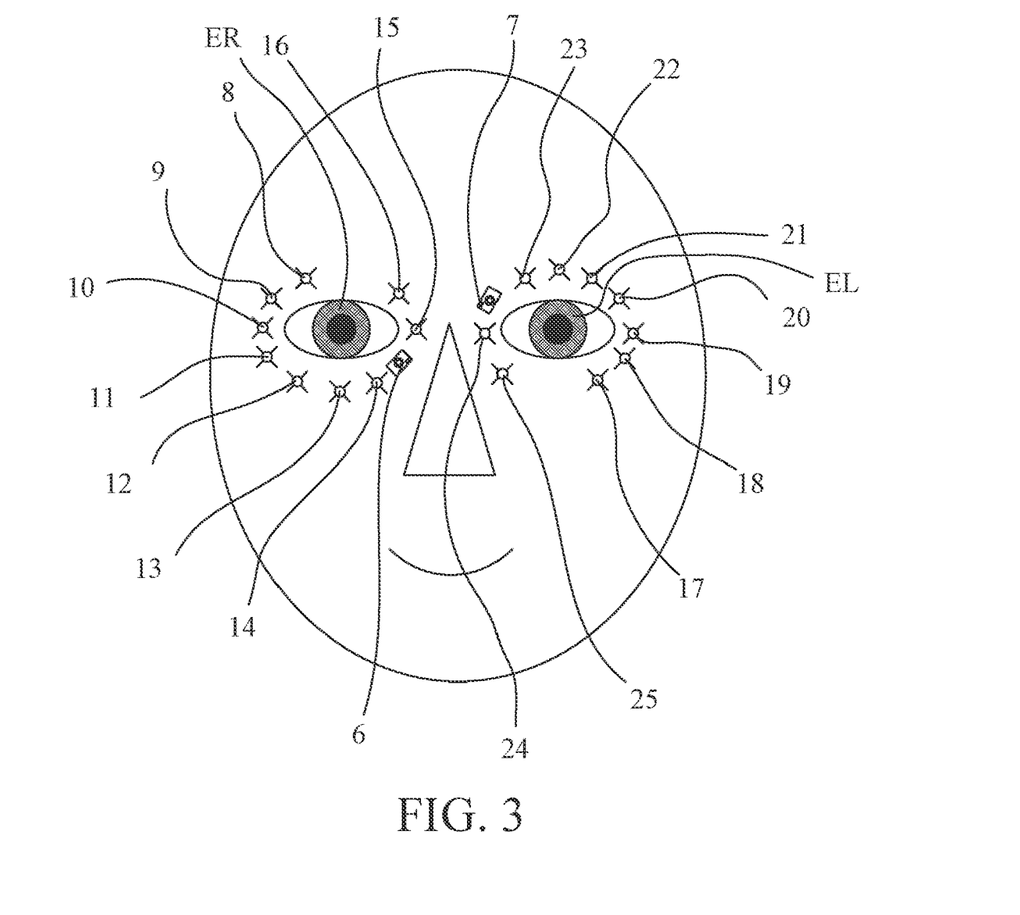
FIG. 3 illustrates a positional relationship among both eyes of a user, visual line sensors, and infrared-emitting (or infrared light-emitting) diodes (IREDs) according to the first embodiment.

FIG. 3 illustrates the right-eye and left-eye visual line sensors 6 and 7 and the right-eye and left-eye IREDs 8 to 25 around a right eye ER and a left eye EL in a case where the face of the user wearing the HMD according to this embodiment is viewed from the front. The right-eye visual line sensor 6 and the right-eye IREDs 8 to 16 are arranged to surround the right eye ER of the user. The right-eye visual line sensor 6 is disposed diagonally downward, on the nasal side (left side) of the right eye ER of the user. The left-eye visual line sensor 7 and the left-eye IREDs 17 to 25 are arranged so as to surround the left eye EL of the user. The left-eye visual line sensor 7 is disposed diagonally upward above, on the nasal side (right side) of the left eye EL.

Thus, the right-eye and left-eye visual line sensors 6 and 7 capture images of the right eye ER and left eye EL from the lower left and upper right sides of the right eye ER and left eye EL, respectively. That is, an imaging direction in which the right-eye visual line sensor 6 images the right eye ER and an imaging direction in which the left-eye visual line sensor 7 images the left eye EL are different from each other and the positions of the right-eye visual line sensor 6 and the left-eye visual line sensor 7 in the vertical direction with respect to the right eye ER and the left eye EL are different from each other. That the imaging directions of the right-eye and left-eye visual line sensors 6 and 7 are different from each other can be rephrased as that the imaging optical axis directions of the right-eye and left-eye visual line sensors 6 and 7 are unparallel to each other.

As described above, more right-eye IREDs 8 to 16 and more left-eye IREDs 17 to 25 are provided on the sides of the right-eye and left-eye visual line sensors 6 and 7 with respect to the right eye ER and left eye EL, respectively, than on the sides on which there is no right-eye or left-eye visual line sensor 6 or 7.

A description will now be given of effects of arranging the right-eye and left-eye visual line sensors 6 and 7 and the right and right-eye IREDs 8 to 16 and 17 to 25 as described above.

Figure 4A:
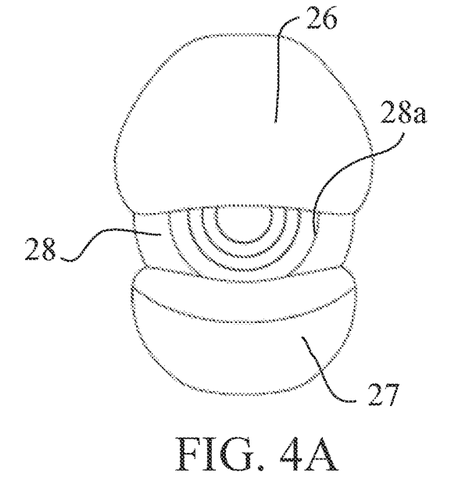
FIGS. 4A and 4B illustrate a three-dimensional structure of an eye (with a thick upper eyelid).
Figure 4B:
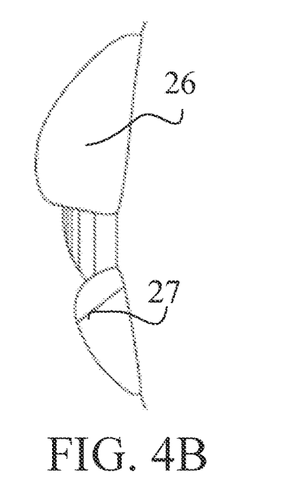
Figure 5A:
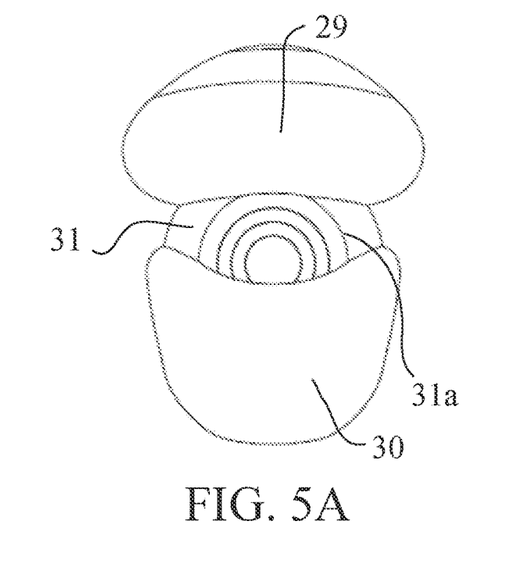
FIGS. 5A and 5B illustrate a three-dimensional structure of an eye (with a thick lower eyelid).
Figure 5B:
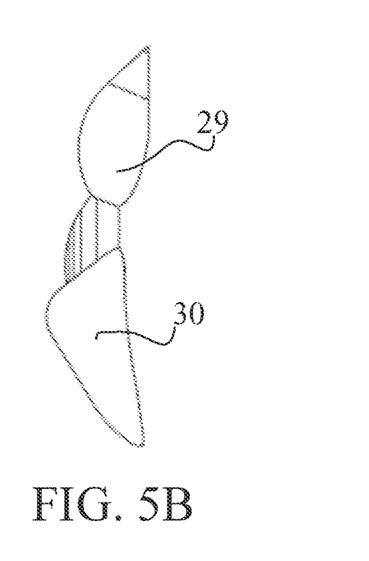

FIGS. 4A and 4B illustrate a three-dimensional structure of the eye of the user viewed from the front and side, respectively, where an upper eyelid 26 is thicker than a lower eyelid 27. In an eyeball 28, a cornea and a sclera are separated by a boundary line 28a. FIGS. 5A and 5B illustrate a three-dimensional structure of the eye of the user viewed from the front and the side, respectively, where a lower eyelid 30 is thicker than an upper eyelid 29. In an eyeball 31, a cornea and a sclera are separated by a boundary line 31a.

Figure 6:
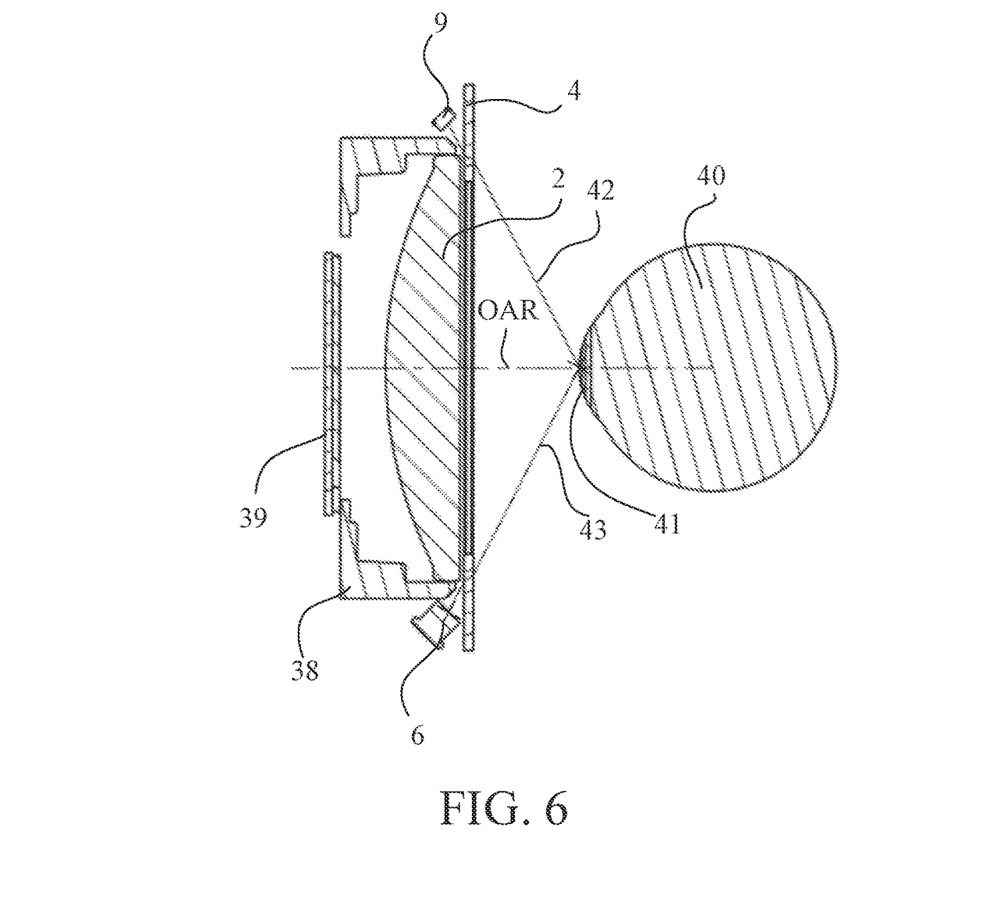
FIG. 6 is a sectional view of the display unit and a right eyeball according to the first embodiment.

FIG. 6 illustrates a section of the right-eye display element 39, the right-eye optical system 2, and a right eyeball 40 of the user in a case where the user wears the HMD according to this embodiment. This section is a section along the optical axis OAR of the right-eye optical system 2. The right-eye optical system 2 and the right-eye display element 39 are held by a holding member 38.

Light emitted from the right-eye display element 39 enters the right eyeball 40 through the right-eye optical system 2. Illumination light (IR light) emitted from the right-eye IRED 9 irradiates a cornea 41 of the right eyeball 40 from a direction (upwardly) tilted to the optical axis OAR of the right-eye optical system 2. The right-eye visual line sensor 6 faces the right eyeball 40 from a direction (downwardly) tilted to the optical axis OAR of the right-eye optical system 2. Thereby, the entire or most of the cornea 41 of the right eyeball 40 close to the display unit can be imaged with a limited angle of view of the right-eye visual line sensor 6.

The right-eye visual line sensor 6 captures an iris image (pupil image) formed by light reflected by the cornea 41 out of the illumination light and captures a specular reflection image formed by light that passes an optical path 42 out of the illumination light, is specularly reflected by the cornea 41, and follows an optical path 43.

Illumination lights emitted from the other right-eye IREDs 8, 10 to 16 are also irradiated to the right eyeball from directions tilted to the optical axis OAR, and the right-eye visual line sensor 6 captures an iris image and a specular reflection image formed by the illumination lights. By illuminating one cornea 41 with the illumination lights from the plurality of right-eye IREDs 8 to 16 in this manner, uneven illumination of the cornea 41 can be reduced. The above description of FIG. 6 is similarly applied to the left-eye side.

Referring now to FIGS. 7 to 16, a description will be given of the specular reflection image formed by lights reflected by the cornea out of the illumination lights incident on the cornea from the IREDs. These figures illustrate the peripheries of the right eye ER and left eye EL of the user viewed from the front, and a specular reflection image formed by light from which IRED is captured by the visual line sensor according to the thicknesses of the upper and lower eyelids of the user and the visual line directions of the right eye ER and the left eye EL. FIGS. 7 to 16 illustrate the eyelids and eyeballs of the right eye ER and left eye EL are laterally symmetrical with respect to the centers of the eyeballs, and corresponding elements of the right eye ER and the left eye EL will be designated by the same reference numerals.

This embodiment can acquire imaging information (image data) of the iris image and the specular reflection image independently for each of the right-eye side and the left-eye side by arranging a plurality of IREDs and visual line sensors on each of the right-eye side and the left-eye side. The control circuit 67 detects the visual line direction (visual line) using imaging information acquired from at least one of the right-eye side and the left-eye side. More specifically, in a case where effective imaging information is acquired from both of the right-eye side and the left-eye side, a visual line is detected using the imaging information on the larger number of specular reflection images. A visual line detecting method using an iris image and a regular reflection image may use, for example, the method described in Japanese Patent No. 3186072.

The control circuit 67 also detects which area the visual line of the user is directed in the image displayed on the display element 39 (that is, right-eye and left-eye gaze positions), based on the visual line detection result. For example, in a case where an image displayed on the display element 39 is a captured image acquired by an unillustrated external imaging camera that images an external area, the control circuit 67 controls the external imaging camera so that the detected gaze position is focused or zoomed in.

Figure 7:
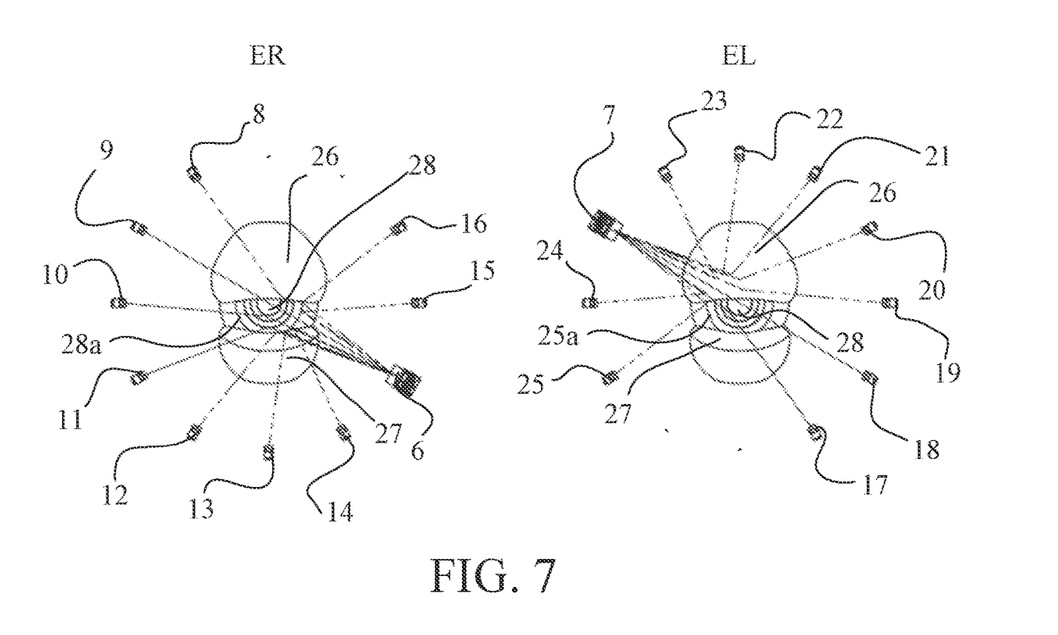
FIG. 7 illustrates specular reflection images according to eyelid thickness and visual line direction in the first embodiment.
Figure 8:
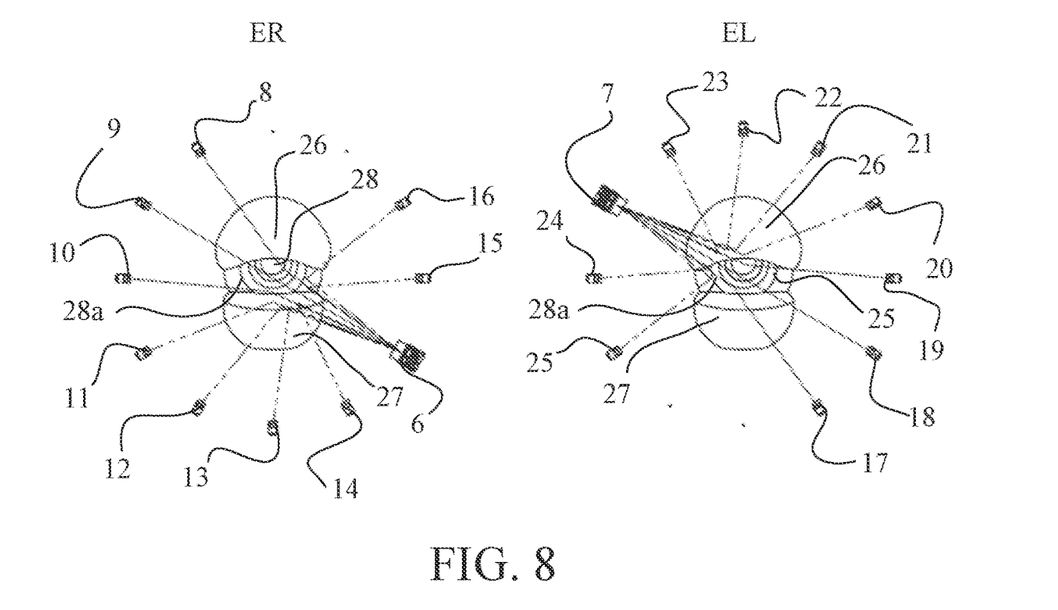
FIG. 8 illustrates specular reflection images according to the eyelid thickness and visual line direction in the first embodiment.
Figure 9:
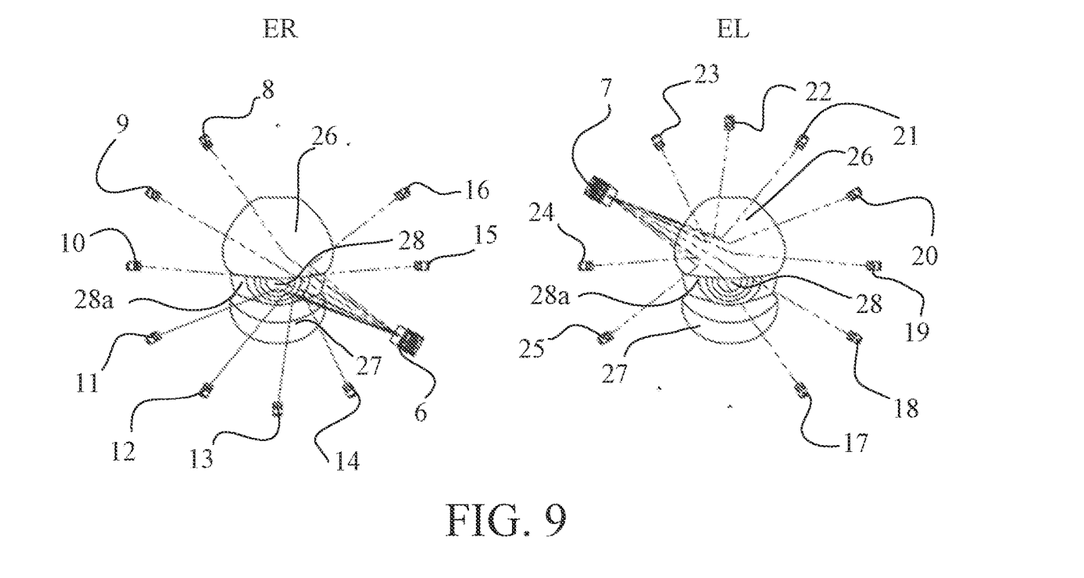
FIG. 9 illustrates specular reflection images according to the eyelid thickness and visual line direction in the first embodiment.
Figure 10:
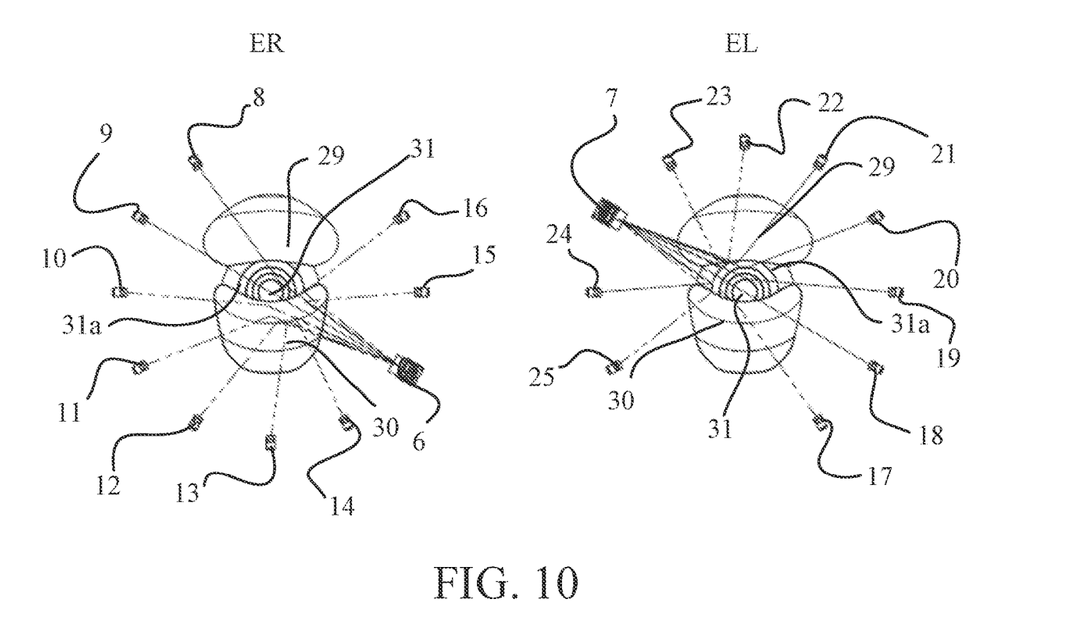
FIG. 10 illustrates specular reflection images according to the eyelid thickness and visual line direction in the first embodiment.
Figure 11:
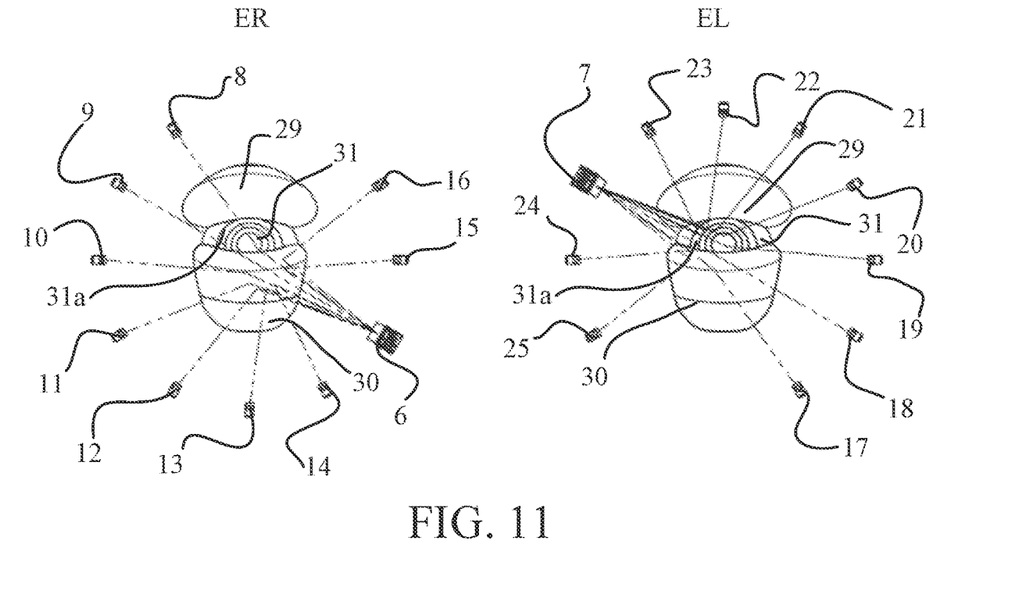
FIG. 11 illustrates specular reflection images according to the eyelid thickness and visual line direction in the first embodiment.
Figure 12:
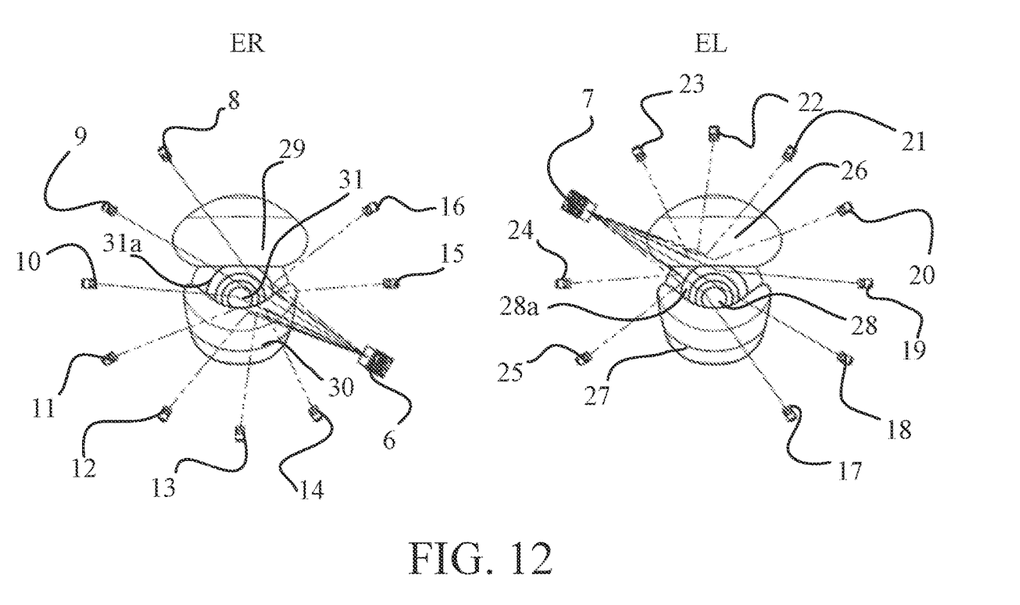
FIG. 12 illustrates specular reflection images according to the eyelid thickness and visual line direction in the first embodiment.
Figure 13:
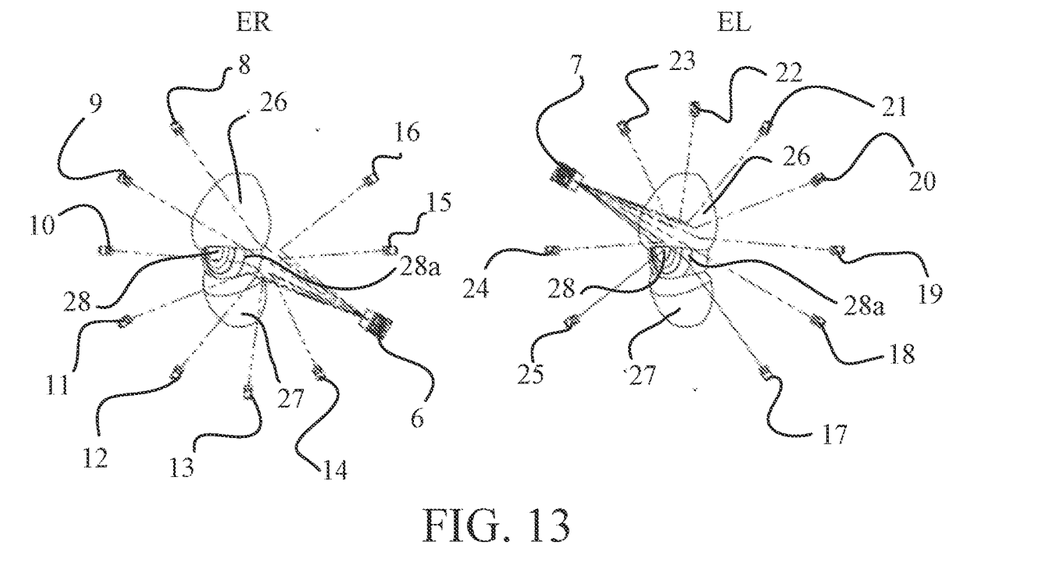
FIG. 13 illustrates specular reflection images according to the eyelid thickness and visual line direction in the first embodiment.
Figure 14:
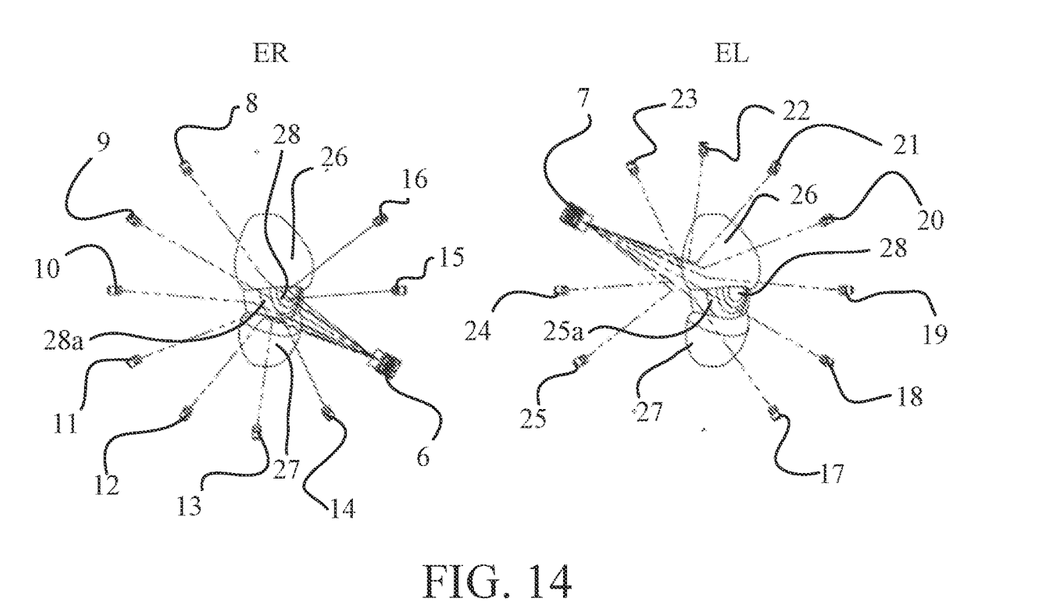
FIG. 14 illustrates specular reflection images according to the eyelid thickness and visual line direction in the first embodiment.
Figure 15:
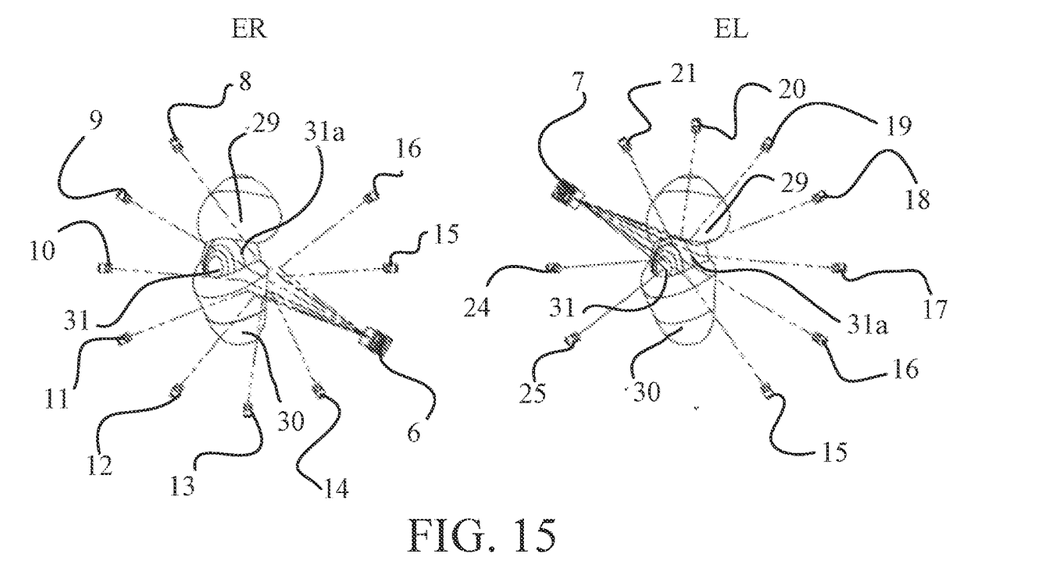
FIG. 15 illustrates specular reflection images according to the eyelid thickness and visual line direction in the first embodiment.
Figure 16:
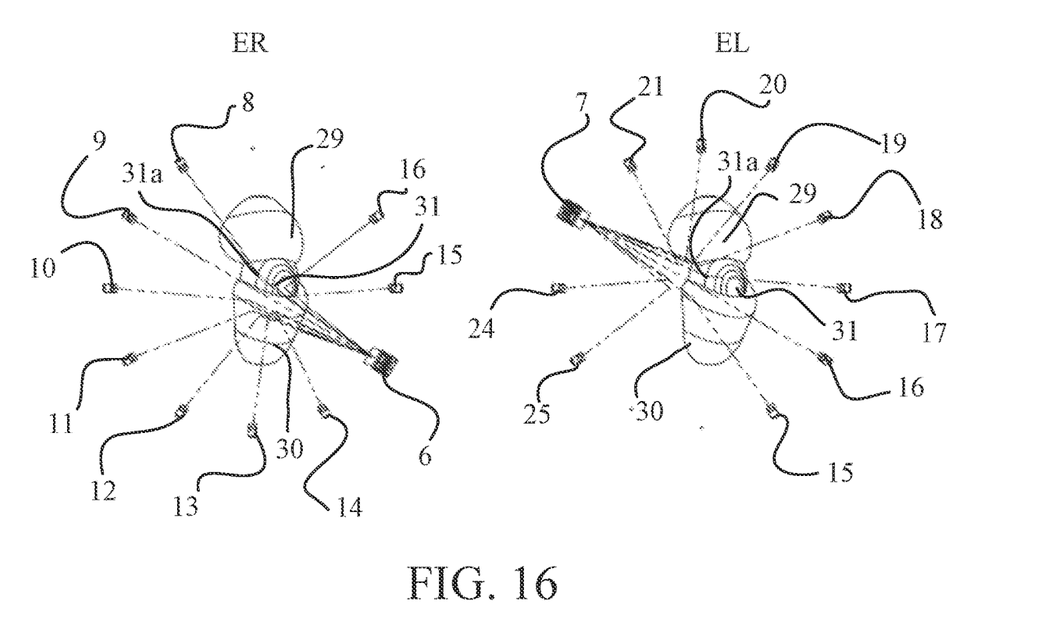
FIG. 16 illustrates specular reflection images according to the eyelid thickness and visual line direction in the first embodiment.

FIGS. 7, 8, and 9 illustrate a state in which the user with the thick upper eyelid illustrated in FIGS. 4A and 4B directs each of his visual lines of both eyes (ER, EL) to a front (center), an upward direction, and a downward direction, respectively. FIGS. 10, 11, and 12 illustrate a state in which the user with the thick lower eyelid illustrated in FIGS. 5A and 5B directs each of his visual lines of both eyes to a front, an upward direction, and a downward direction, respectively. FIGS. 13 and 14 illustrate a state in which the user with the thick upper eyelid illustrated in FIGS. 4A and 4B directs each of his visual lines of both eyes to the right and the left. FIGS. 15 and 16 illustrate a state in which the user with the thick upper eyelid illustrated in FIGS. 5A and 5B directs each of his visual lines of both eyes to the right and the left. In each figure, a solid line indicates an optical path to the visual line sensor from the IRED that emits effective light that enters the cornea and forms a specular image, and an alternate long and two short dashes line indicates an optical path from the IRED that emits ineffective light that does not enter the cornea due to light shielding at the eyelid and diffusions at the sclera or form a specular image.

Figure 17:
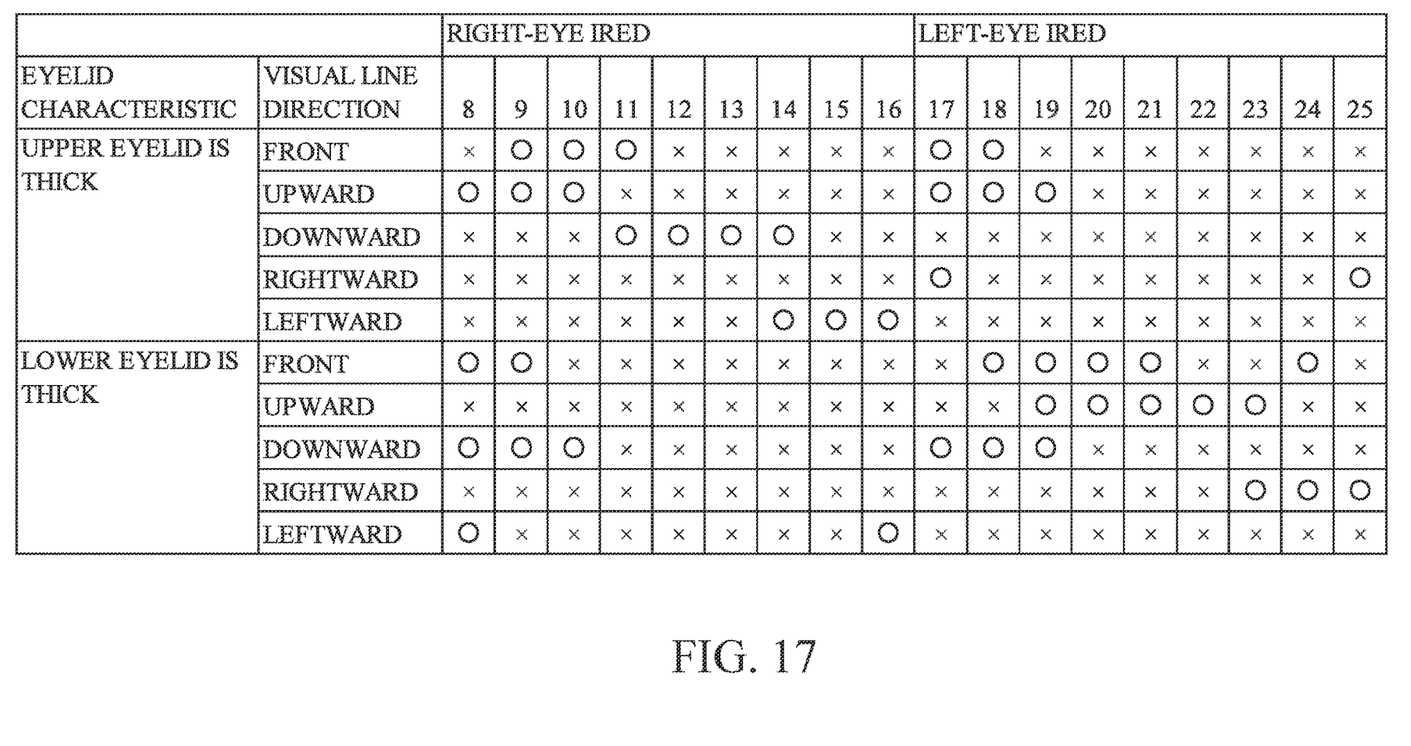
FIG. 17 is a table that summarizes an imaging availability of a specular reflection image using a visual line sensor for each characteristic of the eyelid and for each visual line direction in the first embodiment.

FIG. 17 is a table that summarizes an imaging availability of a specular reflection image formed by effective light in each of the states illustrated in FIGS. 7 to 16 using the visual line sensors 6 and 7. A circle indicates that imaging is available, and a cross indicates that imaging is unavailable.

For example, for both the user having the thick upper eyelid and the user having the thick lower eyelid, a specular reflection image can be captured on each of the right-eye side and the left-eye side in a case where the visual line is directed to the front. In this case, for the user having the thick upper eyelid, a visual line is detected using imaging information acquired from the right-eye side where the number of specular reflection images to be captured is more, and for the user having the thick lower eyelid, a visual line is detected using imaging information acquired from the left-eye side where the number of specular reflection images is more. In a case where the visual line direction of the user having the thick upper eyelid is the upward direction and the visual line direction of the user having the thick lower eyelid is the downward direction, a specular reflection image can be captured on each of the right-eye side and the left-eye side. In this case, since the number of specular reflection images to be captured is the same between the right-eye side and the left-eye side, a visual line can be detected with imaging information acquired from one of them.

In a case where the visual line sensors and IREDs are arranged in a mirror image relationship (line symmetry) between the right-eye side and the left-eye side as in the prior art for a human having approximately laterally symmetrical right and left eyes, the conditions under which the illumination lights from the IREDs are shielded are the same between the right-eye side and the left-eye side in a case where the visual line directions of the user are the upward or downward directions. On the other hand, this embodiment makes different between the right-eye side and the left-eye side the conditions under which the illumination lights are shielded in a case where the visual line directions of the user are the upward or downward directions, using a non-mirror image relationship (non-line symmetry) in which the pair of the visual line sensors and the IREDs are arranged opposite to each other in the vertical direction.

Therefore, as illustrated in FIG. 17, in a case where the visual line direction of the user having the thick upper eyelid is the downward direction, even if a specular reflection image cannot be captured on the left-eye side, a specular reflection image can be captured on the right-eye side. In a case where the visual line direction of the user having the thick lower eyelid is the upward direction, even if a specular reflection image cannot be captured on the right-eye side, a specular reflection image can be captured on the left-eye side. Thus, in a case where at least the position of the visual line sensor in the vertical direction with respect to each eye (that is, the optical system) is different between the right-eye side and the left-eye side, the probability of detecting the visual line on at least one of the right-eye side and the left-eye side can be raised in a case where the visual line direction of the user is the upward or downward direction.

In this embodiment, the right-eye and left-eye visual line sensors 6 and 7 are arranged on the nasal side of the right eye and on the nose side of the left eye, respectively, such that the right-eye visual line sensor 6 images a specular reflection image from the right eye ER from the left side and the left-eye visual line sensor 7 images a specular reflection image from the left eye EL from the right side. Thus, since the right-eye and left-eye visual line sensors 6 and 7 are disposed on opposite sides in the lateral direction with respect to the right eye ER and left eye EL, the conditions under which the illumination light is shielded can be made different between the right-eye side and the left-eye side in a case where the visual line direction of the user is a rightward or leftward direction.

Therefore, as illustrated in FIG. 17, in a case where the visual line direction of the user having the thick upper eyelid is the rightward direction, a specular reflection image cannot be captured on the right-eye side but can be captured on the left-eye side. In a case where his visual line direction is the leftward direction, a specular reflection image cannot be captured on the left-eye side but can be captured on the right-eye side. This is similarly applied to a case where the visual line of the user having the thick lower eyelid is the rightward or leftward direction. Thus, in a case where at least the position of the visual line sensor in the lateral direction with respect to each eye (that is, the optical system) is different between the right-eye side and the left-eye side, the probability of detecting the visual line on at least one of the right-eye side and the left-eye side can be raised in a case where the visual line direction of the user is the rightward or leftward direction.

Figure 18:
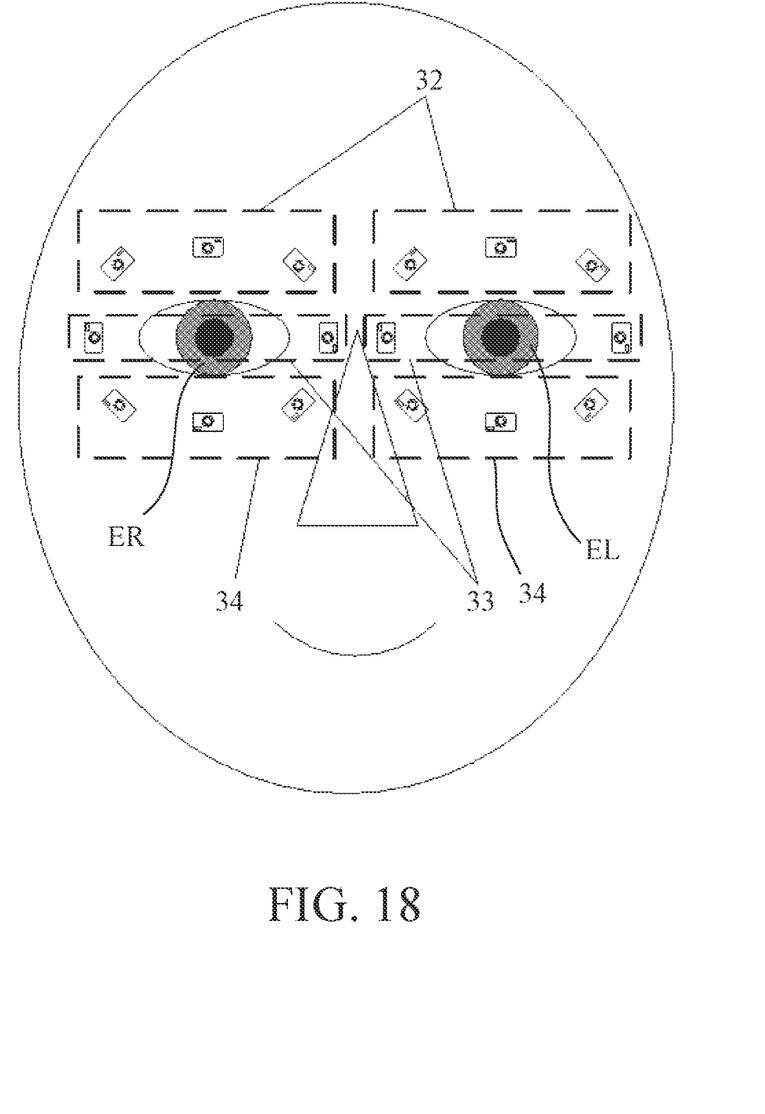
FIG. 18 illustrates the positions of the visual line sensors in the vertical directions according to the first embodiment.

FIG. 18 illustrates the positions (heights) of the right-eye and left-eye visual line sensors 6 and 7 arranged in the vertical direction for each of the right eye ER and left eye EL. Camera-shaped positions in FIG. 18 are candidate positions of the right-eye and left-eye visual line sensors 6 and 7. In FIG. 18, areas 32 are higher than the right eye ER and the left eye EL, areas 33 are as high as the right eye ER and the left eye EL, and areas 34 are lower than the right eye ER and the left eye EL.

Figure 19:
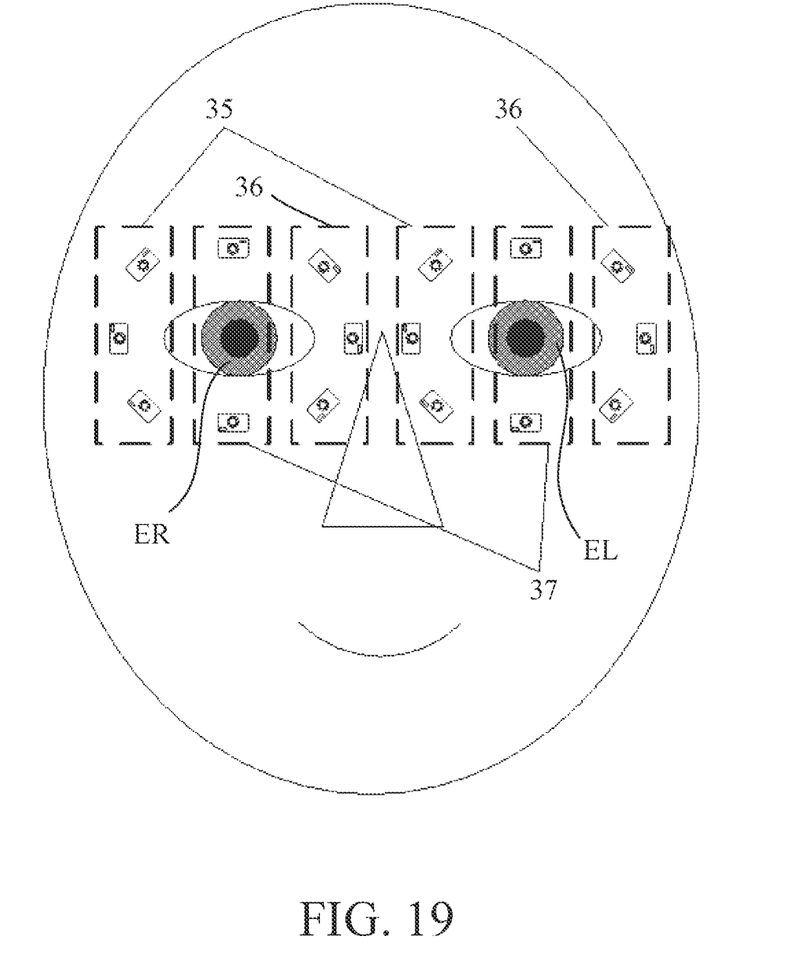
FIG. 19 illustrates the positions of the visual line sensors in the lateral directions according to the first embodiment.

FIG. 19 illustrates the positions of the right-eye and left-eye visual line sensors 6 and 7 arranged in the lateral direction for each of the right eye ER and left eye EL. In FIG. 19, areas 35 are located on the right sides of the right eye ER and the left eye EL, areas 36 are located on the left sides of the right eye ER and the left eye EL, and areas 37 contain the right eye ER and the left eye EL. In this embodiment, the right-eye visual line sensor 6 is located in an area where the areas 34 and 36 overlap each other, and the left-eye visual line sensor 7 is located in an area where the areas 32 and 35 overlap each other.

As described above, this embodiment arranges the right-eye and left-eye visual line sensors 6 and 7 in mutually different areas among the areas 32, 33, and 34 arranged in the vertical direction, and in mutually different areas among the areas 32, 33, and 34 arranged in the lateral direction. Thereby, the probability of detecting a visual line on at least one of the right-eye side and the left-eye side can be raised regardless of the three-dimensional structures and the visual line directions of the eyes of the user.

This embodiment makes different the arrangement of the IREDs between the right-eye side and the left-eye side, and thereby enables a visual line to be detected with the smaller number of IREDs than that in a case where the same number of IREDs are provided between the right-eye side and the left-eye side.

The right-eye visual line sensor 6 may be located in an area where the areas 32 and 35 illustrated in FIGS. 18 and 19 overlap each other, and the left-eye visual line sensor 7 may be located in an area where the areas 34 and 36 overlap each other. An arrangement different from that of this embodiment may be used, for example, one of the right-eye and left-eye visual line sensors 6 and 7 may be located in an area where the areas 33 and 35 overlap each other, and the other visual line sensor may be located in an area where the area 32 or 34 and the area 36 overlap each other.

Second Embodiment

Figure 20:
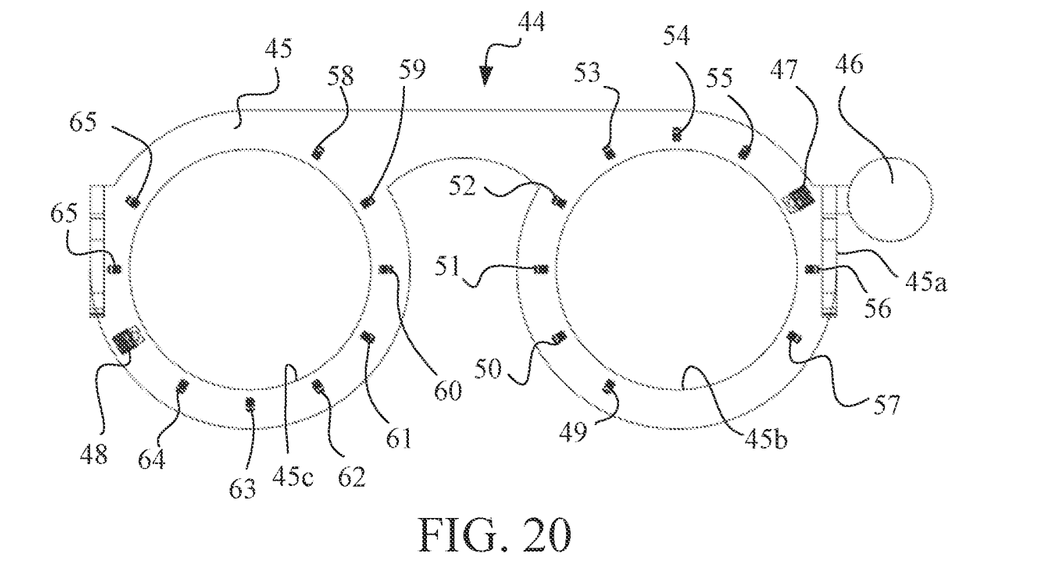
FIG. 20 illustrates a surface on an eye side of visual line detecting glasses according to a second embodiment.
Figure 21:
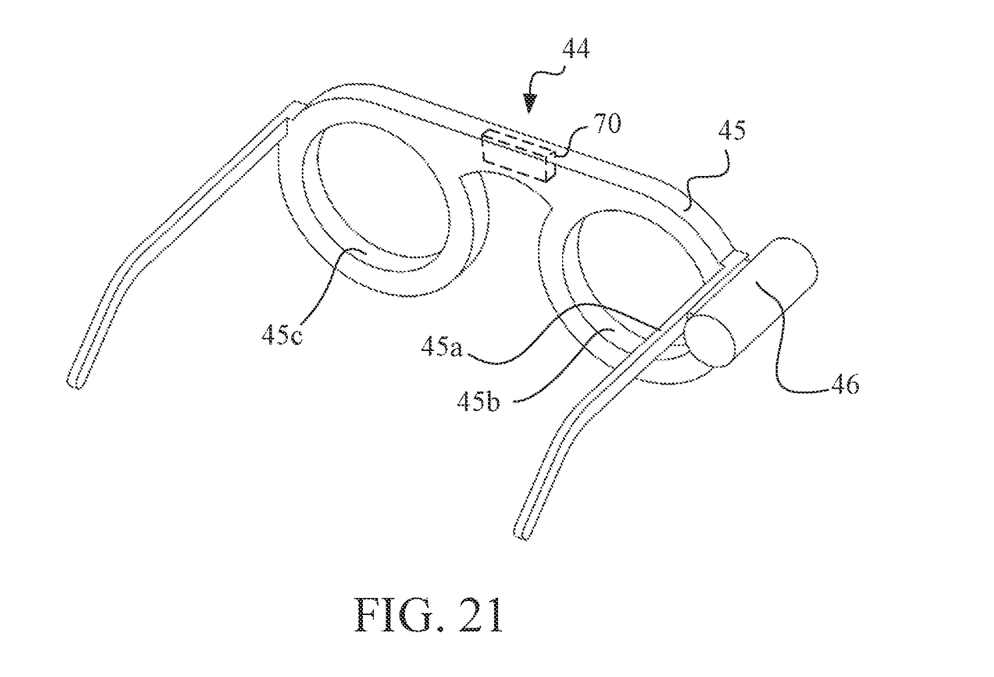
FIG. 21 is a perspective view of the visual line detecting glasses according to the second embodiment.

FIGS. 20 and 21 illustrate a pair of visual line detecting glasses 44 as a visual line processing apparatus including the visual line detecting apparatus according to a second embodiment of the disclosure. FIG. 20 illustrates the pair of visual line detecting glasses 44 viewed from the side of the eyes of the user, and FIG. 21 illustrates the pair of entire visual line detecting glasses 44.

The pair of visual line detecting glasses 44 includes a frame 45 and an external imaging camera 46 attached to a right temple portion 45a of the frame 45. Lenses for near-sightedness, farsightedness, dimming, or non-prescription lenses may be inserted into left and right openings 45b and 45c in the frame 45, or no lenses may be inserted.

In FIG. 20, a right-eye visual line sensor 47 and a plurality of (nine in this embodiment) right-eye IREDs 49 to 57 are arranged around the right opening 45b in the eye-side surface of the frame 45, and a left-eye visual line sensor 48 and nine left-eye IREDs 58 to 66 are arranged around the left opening 45c in the eye-side surface of the frame 45.

The external imaging camera 46, visual line sensors 47 and 48, and IREDs 49 to 66 are connected to a control circuit 70 illustrated in FIG. 21. The control circuit 70 detects a visual line using imaging information acquired from at least one of the right-eye visual line sensor 47 and the left-eye visual line sensor 48 in a way similar to that of the first embodiment, and detects right-eye and left-eye gaze positions in the external area (captured image) to be captured by the external imaging camera 46. The control circuit 70 controls the external imaging camera 46 so as to focus or zoom in on the detected gaze positions.

The right-eye visual line sensor 47 is located in an area where the areas 32 and 35 illustrated in FIGS. 18 and 19 overlap each other, and the left-eye visual line sensor 48 is located in an area where the areas 34 and 36 overlap each other. That is, similar to the first embodiment, the vertical and lateral positions of the right-eye and left-eye visual line sensors 47 and 48 are different from each other with respect to the right eye and left eye. Therefore, the probability of detecting a visual line using at least one of the visual line sensors can be raised regardless of the three-dimensional structures and the visual line directions of the eyes of the user.

The above embodiment can raise the probability of detecting the visual line direction on at least one of the right-eye side and the left-eye side regardless of the three-dimensional structures and the visual line directions of the eyes of the user.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-173644, filed on Oct. 25, 2021, which is hereby incorporated by reference herein in its entirety.

What is claimed is:

1. A head mount display configured to detect visual line directions of a right eye and a left eye, the head mount display comprising:
   a right-eye display element configured to display an image formed by light reflected by the right eye;
   a left-eye display element configured to display an image formed by light reflected by the left eye;
   a right-eye optical system configured to transmit lights from the right-eye display element to the right eye;
   a left-eye optical system configured to transmit lights from the left-eye display element to the left eye;
   a plurality of right-eye illumination elements each configured to emit light to the right eye;
   a plurality of left-eye illumination elements each configured to emit light to the left eye;
   a right-eye camera configured to capture the image formed by light reflected by the right eye, out of the lights from the plurality of right-eye illumination elements; and
   a left-eye camera configured to capture the image formed by light reflected by the left eye, out of the lights from the plurality of left-eye illumination elements,
   wherein the right-eye camera and the left-eye camera are arranged such that:
      an imaging direction of the right-eye camera and an imaging direction of the left-eye camera are different from each other,
   wherein, viewed from a right-eye side of a user, the right-eye camera is located at a m o'clock position around the optical axis of the right-eye optical system, and is not located at a n o'clock position, which is different from the m o'clock position, and
   wherein, viewed from a left-eye side of the user, the left-eye camera is located at the n o'clock position around the optical axis of the left-eye optical system, and is not located at the m o'clock position.

2. The head mount display according to claim 1, wherein the right-eye camera and the left-eye camera are arranged such that the right-eye camera is located on one of an upper side and a lower side of the right eye, and the left-eye camera is located on the other of the upper side and the lower side of the left eye in the vertical direction.

3. The head mount display according to claim 1, wherein the right-eye camera and the left-eye camera are arranged such that the right-eye camera is located on one of a right side and a left side of the right eye, and the left-eye camera is located on the other of the right side and the left side of the left eye.

4. The head mount display, apparatus according to claim 1, wherein the plurality of right-eye illumination elements and the plurality of left-eye illumination elements are arranged such that an arrangement of the plurality of right-eye illumination elements relative the right eye and an arrangement of the plurality of left-eye illumination elements relative the left eye are different from each other.

5. The head mount display, apparatus according to claim 4, wherein the right-eye camera and the left-eye camera are arranged such that the right-eye camera is located in one of an upper area and a lower area of the right eye in the vertical direction and the left-eye camera is located in the other of the upper area and the lower area of the left eye in the vertical direction, and wherein the plurality of right-eye illumination elements and the plurality of left-eye illumination elements are arranged such that the number of right-eye illumination elements located in the one area is more than the number of right-eye illumination elements located in the other area and the number of left-eye illumination elements located in the other area is more than the number of left-eye illumination elements located in the one area.

6. A visual line processing apparatus comprising:
a head mount display configured to detect visual line directions of a right eye and a left eye; and
an external imaging camera configured to capture an external area,
wherein the head mount display includes:
a right-eye display element configured to display an image formed by light reflected by the right eye;
a left-eye display element configured to display an image formed by light reflected by the left eye;
a right-eye optical system configured to transmit lights from the right-eye display element to the right eye;
a left-eye optical system configured to transmit lights from the left-eye display element to the left eye;
a plurality of right-eye illumination elements each configured to emit light to the right eye;
a plurality of left-eye illumination elements each configured to emit light to the left eye;
a right-eye camera configured to capture the image formed by light reflected by the right eye, out of the lights from the plurality of right-eye illumination elements; and
a left-eye camera configured to capture the image formed by light reflected by the left eye, out of the lights from the plurality of left-eye illumination elements,
wherein the right-eye camera and the left-eye camera are arranged such that
an imaging direction of the right-eye camera and an imaging direction of the left-eye camera are different from each other, and
a position of the right-eye camera relative to the right eye and a position of the left-eye camera relative to the left eye are different from each other in a vertical direction orthogonal to a lateral direction in which the right eye and the left eye are arranged,
wherein the visual line processing apparatus detects gaze positions of the right eye and the left eye in the external area based on the visual line directions detected by the head mount display,
wherein, viewed from a right-eye side of a user, the right-eye camera is located at a m o'clock position around the optical axis of the right-eye optical system, and is not located at a n o'clock position, which is different from the m o'clock position, and
wherein, viewed from a left-eye side of the user, the left-eye camera is located at the n o'clock position around the optical axis of the left-eye optical system, and is not located at the m o'clock position.

7. The head mount display according to claim 1, wherein m is a value from 6 to 9, and n is a value from 0 to 3.

8. The head mount display according to claim 7, wherein a value of m is eight and a value of n is two.

* * * * *